Oct. 27, 1970 C. E. MACON ET AL 3,537,072
INSTRUCTION CONVERSION SYSTEM AND APPARATUS
Filed June 19, 1967 4 Sheets-Sheet 3

INVENTORS.
CHARLES E. MACON
ROBERT S. BARTON
PAUL A. QUANTZ
GEORGE T. SHIMABUKURO
BY Christie, Parker & Hale
ATTORNEYS.

United States Patent Office 3,537,072
Patented Oct. 27, 1970

3,537,072
INSTRUCTION CONVERSION SYSTEM
AND APPARATUS
Charles E. Macon, Arcadia, Calif., Robert S. Barton, Salt Lake City, Utah, Paul A. Quantz, Scottsdale, Ariz., and George T. Shimabukuro, Monterey Park, Calif., assignors to Burroughs Corporation, Detroit, Mich., a corporation of Michigan
Filed June 19, 1967, Ser. No. 646,953
Int. Cl. G06f 9/20
U.S. Cl. 340—172.5
22 Claims

ABSTRACT OF THE DISCLOSURE

A data processing system having a digital data processor a disk file storage system for storing program instructions and data and an electronic program analyzer. The program instructions specify operations to be performed in data stored in the disk file storage system. The program analyzer converts program instruction into disk file instructions for control of the disk file storage system and into data processor instructions for the data processor. An instruction queue, utilizing linking addresses stores instructions waiting to be executed.

CROSS REFERENCE TO RELATED APPLICATIONS

The present invention is directed to a program analyzer separately and in combination with the associated data processing system. A copending patent application entitled "Instruction Storage and Retrieval Apparatus for Cyclical Storage Means" filed on the same data as this application and now issued at Pat. No. 3,490,006 is directed to the distributor memory system and associated disk storage and electronic and control units disclosed in the present application. Another copending patent application entitled "Multi-Program Data Processor," filed on the same date as this application and now issued as Pat. No. 3,487,375 is directed to the instruction queue disclosed in the present patent application.

BACKGROUND OF THE INVENTION

The present invention relates to digital data processing systems and, more particularly, to new organizations in data processing systems and apparatus for use therein.

Data processing systems are known which utilize auxiliary storage systems for storing large quantities of information. The systems normally include a working memory associated with a data processor. Portions of the information contained in the auxiliary storage systems are transferred to working memory as needed by the data processor. The transfer of data is initiated by signals or instructions sent to the auxiliary storage system by the data processor.

The data processor receives and executes data processor instructions on data stored in the working memory. The data processor instructions are stored in working memory during their execution by the data processor.

The above-mentioned prior art systems are oriented around the data processor. The data processor is the central part of the system and it dictates the operations to be performed by the rest of the system. The data processor executes program instructions stored in the system directly. Whenever data is needed from the auxiliary storage system, the data processor initiates the sending of instructions to the auxiliary storage system to obtain the data. Similarly, whenever data is to be stored into the auxiliary storage system the data processor initiates the needed operation. Therefore, the operations of the system are dependent upon the data processor and are limited by its operations. Also, the overall speed of the system is slowed down considerably because of the many operations which must be carried out by the data processor.

Modern auxiliary storage devices have been developed with extremely high transfer rates. However, data processing systems cannot use these devices even near their maximum transfer rates because of the way in which the systems are organized. One example of a bulk storage device with high transfer rates is a disk file unit with a read and write head per track.

Previous data processing systems have been used to carry out a number of different programs and in order to do this have attempted to multiplex the running of the programs. However, it has been difficult to multiplex programs on prior art data processing systems because of the organization of the system.

SUMMARY OF THE INVENTION

A data processing system organized in accordance with the present invention is centered on a large capacity storage device. The invention is applicable to other types of storage devices, however, a disk storage device is a preferred storage device. In accordance with the present invention it is possible to exploit the capacity and high information transfer rate of a disk storage device which has a read and write head for each track on the disk. Because switching between the tracks can be accomplished in a few microseconds, it is possible to approach full utilization of the information transfer rate while transferring information from the disk storage units, one word at a time, in an arbitrary sequence.

As a result, a scheme of multi processing is possible wherein program strings are used to generate autonomous instructions which are executed as data becomes available under the reading heads on the disks. The structure provides the sequencing which makes multi processing possible and makes continuous usage of the disk file system possible. Disk accesses, program generation and arithmetic operations can be overlapped in the system.

As a result, a very small working memory is needed for the data processor to supplement the disk storage system.

An advantage of the present invention is that much more efficient use may be made of very high speed auxiliary storage units, particularly those of the cyclical storage type. Also advantage can be taken of the high transfer rate possible with a head per track disk file as the auxiliary storage means. Another feature of the present invention is that a much smaller working memory is needed for operation with the data processor than is required of previously known systems. Another advantage of the present invention is that it allows a larger number of programs to be multiplexed and run simultaneously by the data processing system than is possible with prior art systems. Still another advantage of the present invention is that data can be supplied by an auxiliary storage means to the working memory in advance of the time it is needed by the data processor, with few or no special signals or instructions by the data processor to the auxiliary storage system allowing the processor to reach higher rates of arithmetic operations than is possible with the prior art systems.

Yet another important advantage of the present invention is that autonomous instructions are formed and provided to the auxiliary storage system which can be executed in order to supply data to the working memory as the data becomes available for reading. This is particularly important in cyclical storage systems. Another advantage is that the autonomous instructions need not be formed by the data processor, freeing the data processor for other important tasks.

Still another advantage is that overall a group of programs can be executed much faster than is possible with prior art systems.

Additionally, it is possible to have true overlapping of the fetching of instructions, the storing of information, program generation and arithmetic operations in the data processing system.

Briefly, an embodiment of the invention has a data processor controlled by a first instruction. A bulk storage means is controlled by a second instruction for providing information to the data processor. A program analyzer receives a program instruction and converts it to a first and a second instruction and provides such instructions to the corresponding data processor and bulk storage means for execution.

A program analyzer, in accordance with the present invention, has means for receiving a program instruction including an address for a bulk storage device and includes a source of addresses. A decoding means decodes the program instruction and forms an operator giving an instruction for the bulk storage device for communication with a data processor. Means is provided for combining an address from the source with the operator and the bulk storage address to form a first instruction for execution by the bulk storage device. Means is also provide for combining the same address from the source with at least a portion of the program instruction to form a second instruction for execution by the data processor.

These and other aspects of the present invention may be more fully understood with reference to the following description of an embodiment of the present invention.

DESCRIPTION OF THE PREFERRED EMBODIMENT

Figure 1:
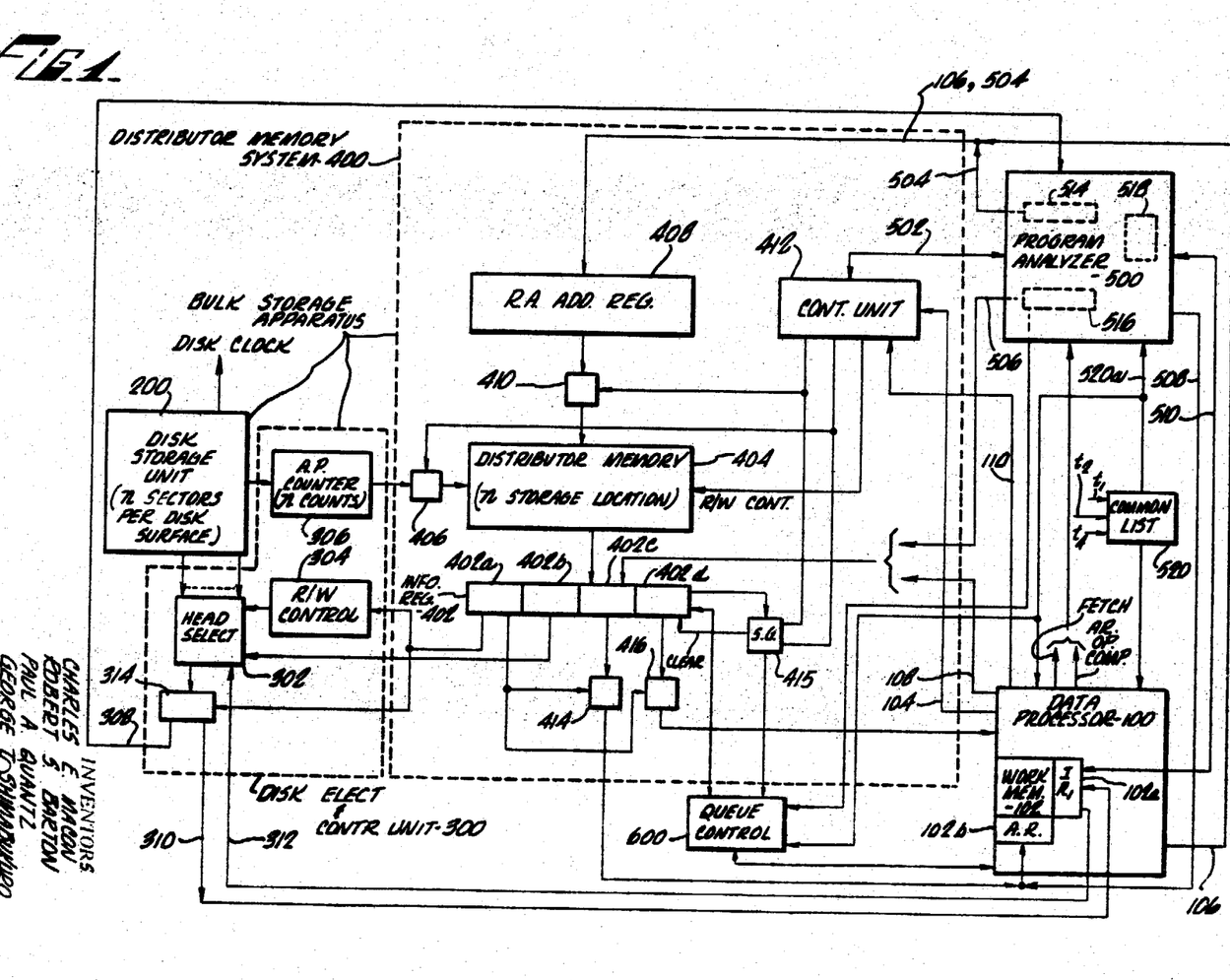
FIG. 1 is a block diagram of a data processing system and embodies the present invention.

Refer now to the block diagram of FIG. 1. A data processor 100 includes a working memory 102. Information, including data to be processed and program to be executed, are stored on a disk in a disk storage unit 200. The program is made up of what are called "primary instructions." Portions of the data are transferred from the disk storage unit 200 to the working memory 102 in advance of the time needed for operation by the data processor 100. A disk electronic and control unit 300 contains the circuitry for selecting heads in the disk storage unit 200 and for reading and writing on the disk of the disk storage unit 200. The disk electronic and control unit 300 operates under control of what are called "disk fiie instructions." The disk file instructions are stored in a distributor memory system 400. The disk storage unit 200, the electronic and control unit 300 and the distributor memory system 400 together form an auxiliary bulk storage apparatus for the data processor 100.

A program analyzer 500 receives the "primary instructions" from the disk storage unit 200 and converts each primary instruction into one or more instructions of two different types. The first type of instruction is called the "disk file instruction." The disk file instructions are sent to the distributor memory system 400 by the program analyzer 500 where they are used to cause the disk electronic and control unit 300 to read or write in the disk storage unit 200 and for control of the transfer of information between the disk storage unit 200 and the data processor 100 and the program analyzer 500.

The second type of instruction which is formed by the program analyzer has not been mentioned, but it is called a "data processor instruction" and is sent to the data processor 100 for controlling the operation of the data processor 100.

Before considering the details of the various units shown in FIG. 1, consider the formats of the above-mentioned instructions.

Figure 5:
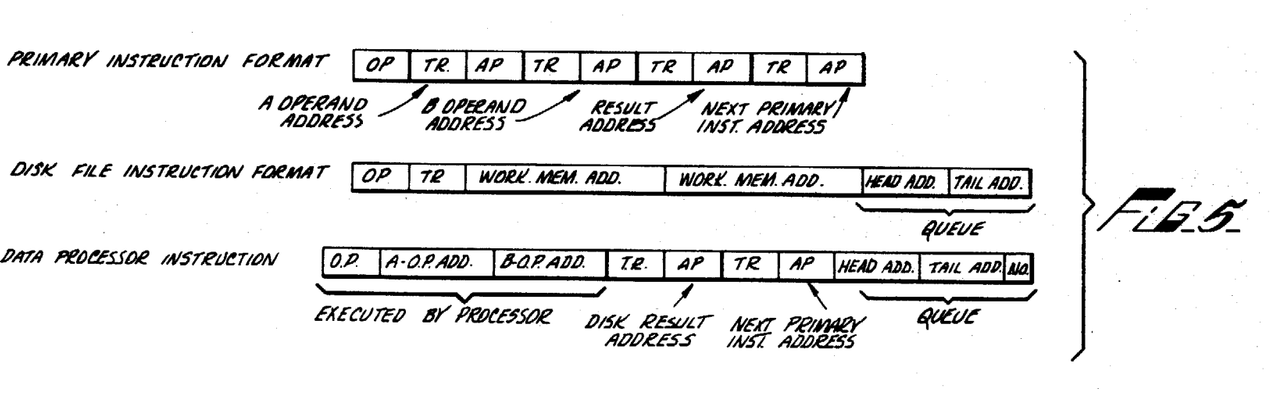
FIG. 5 is an example of instruction formats used in the data processing system of FIG. 1.

Refer to FIG. 5 which is a sketch illustrating the format of the three instructions. The primary instructions are actually the program instructions which direct the overall system operation and are used by the program analyzer to form the disk file instructions and the data processor instructions. The primary instruction has five parts. These parts are an operator (OP) and four different address of four locations in the disk storage unit 200. The four addresses are: the address of and A operand, the address of a B operand, the address where a result is to be stored, and the address where the next primary instruction will be found. Each of the four addresses is divided into two parts. One part identifies the track on a disk (TR) and the second part identifies an angular position on the disk (AP). The addresses actually reference data in the disk file as they identify locations where information is to be filled or where information is to be obtained.

The primary instruction operator (OP) identifies the operation which is to be performed by the data processor 100 on the information contained at the A operand address and the B operand address. Actually, the operands at the A address and the B address on disk are transferred to the working memory 102 of the data procesors 100 for execution by the data processor in accordance with the operator. The result of an arithmetic operation is sent back by the data processor to the disk storage unit 200 for storage at the result location identified in the primary instruction. The next primary instruction address identifies where the next primary instruction is to be obtained from the disk.

Consider the disk file instruction. The disk file instruction contains five different parts. These aparts are: an operator (OP), a track number (TR), two working memory addresses, and a queue.

The disk file instruction operator (OP) identifies one of three different operations. The first type operator is identified as a "fetch" operator. The fetch operator indicates that information is to be removed from the disk storage unit 200 and sent to the program analyzer 500. The fetch operator is used for obtaining primary instructions from the disk storage unit 200 for the program analyzer. The second type of disk file instruction operator is a "store" operator. The store operator causes information from the working memory 102 to be stored into the disk storage unit 200. The third type of disk file operator is a "data" operator. A data operator causes information to be removed from the disk storage unit 200 and sent to the working memory 102 for storage. The queue of the disk file instruction has a head address and a tail address. These addresses are addresses of the working memory which identify the top and bottom of a queue of instructions which are waiting their turn to be executed.

Consider the data processor instructions. The data processor instructions are used only by the data processor 100 to control its internal operation. The data processor instructions have seven different parts. These parts are: an operator (OP), an A operand address, a B operand address, a disk result address, a next primary instruction address, a number digit and a queue. The data processor itself only utilizes the operator (OP) and A and B operand addresses and for this reason may be considered a two-address machine. The remainder of the data processor instruction is not utilized by the data processor but is stored in the working memory. To be explained in detail, the disk result address and next primary instruction address are used by the program analyzer respectively to form disk file instructions which cause a result of an arithmetic operation to be stored back into the disk storage unit 200 and to obtain the next primary instruction from the disk storage unit 200. The number digit is a special purpose digit which is used by the data processor to keep track of whether information has been obtained from the disk storage unit 200 and its use will be described in more detail hereinafter. The queue of the data processor instruction also has a head address and a tail address. These addresses are addresses of the working memory and identify the top and bottom of a corresponding queue of instructions which are waiting their turn to be executed.

In the data processor instructions, the A and B operand addresses are addresses of the working memory 102 where the A and B operand data can be obtained for processing. The operator (OP) identifies the operation to be performed on the operands.

Figure 6:
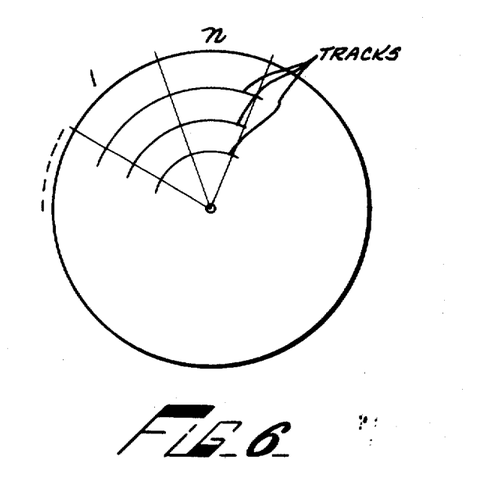
FIG. 6 is a sketch illustrating the layout of information on the disk used in the system of FIG. 1.

Consider the disk storage unit 200. The disk storage unit 200 is a conventional disk file and may have one or more revolving disks having magnetic recording surfaces thereon. Although the disk storage unit 200 may have many disks therein, it is assumed, for purposes of explanation, that there is only one disk. FIG. 6 is a sketch illustrating the layout of information on the disk contained in the disk storage unit 200. The disk contains a plurality of recording tracks on the magnetic recording surface and the tracks are divided into $n$ sectors. Each storage location on the disk is defined by a track number and angular position corresponding to one of the $n$ sectors.

Additionally, the disk storage unit 200 contains a magnetic reading and writing head (not shown) for each track on the magnetic recording disk. In this manner any one of the tracks may be selected for reading and writing at a high speed.

The disk electronic and control unit 300 contains a head selection circuit 302. The head selection circuit may be any one of a number of well known circuits for selecting any one of the read and write heads for reading and writing. The head selection circuit 302 is controlled by a conventional read and write control circuit 304 and information in the information register 402 of the distributor memory system 400. Section 402b of the information register 402 determines the particular read/write head which is selected by the head selection circuit 302 and the read/write control circuit 304 causes either a read operation or a write operation in the selected head. The read/write control circuit is controlled by information in section 402a of the information register 402. To be explained in more detail, an operator and a track number of a disk file instruction are stored in sections 402a and 402b of the information register.

A conventional angular position counter 306 is coupled to the disk storage unit 200 and provides output signals identifying the position of the disk as it rotates in the disk storage unit 200. The angular position counter 306 has $n$ different counts and provides a unique output signal corresponding to each of the $n$ different sectors on the disk. Although an angular position counter is described by way of example, it will be apparent that other well known circuits may be used for providing signals indicative of the angular position of the disk as it rotates.

Consider now the distributor memory system 400. The distributor memory system 400 contains a distributor memory 404. The distributor memory 404 has $n$ different storage locations corresponding to the $n$ different sectors on the disk. To be explained in more detail, the disk file instructions are stored in the storage locations of the distributor memory 404, one instruction being stored in each location. Each instruction is stored in the particular storage location corresponding to the angular position of the disk with which it is associated. The output of the distributor memory 404 is coupled to the information register 402. All information being stored into and read out of the distributor memory 404 is stored in the information register 402.

A gate 406 couples the output of the angular position counter 306 to the distributor memory 404. The angular position counter 306 addresses the memory locations in the distributor memory 404 corresponding to each angular position of the disk causing the contents thereof to be read out in synchronism with the rotation of the disk.

A random access address register 408 is also used for addressing the distributor memory 404. The gate 410 couples the output of the random access address register 408 to the memory 404. The random access address register is used for addressing the distributor memory 404 for storing disk file instructions therein. The distributor memory 404 may be a conventional magnetic core memory in which information is read out and stored via the information register 402 in parallel. However, the invention is not limited thereto and the memory may be any one of a number of other well known memory devices.

A control unit 412 is provided for applying read and write control signals to the distributor memory 404 and for controlling the operation of the gates 406 and 410. Gates 414 and 416 are coupled between the output of the information register 402 and input circuits of the data processor 100. To be explained in more detail, the gates 414 and 416 couple addresses contained in disk file instructions stored in the information register 402 to the data processor 100 under control of a disk file operator in the section 402a of the information register.

A signal generator 415 is used to signal when a memory location in the distributor memory is occupied with a current disk file instruction and therefore cannot store a new disk file instruction. It is also used to signal when a current disk file instruction has been executed and a new one is required from the queue. The signal generator 415 applies its signals to the queue control 600. This causes the queue control 600 to store a new disk file instruction formed by the program analyzer 500 or causes a new disk file instruction to be read out of the queue for the distributor memory depending on the signals.

A common list unit 520 provides addresses to the program analyzer 500 and to the queue control 600 as the addresses are needed. For purposes of explanation of the present invention, the common list unit 520 can be considered as a storage device that has a stock of unused or available addresses and provides such addresses to the system one at a time as they are needed.

The queue control 600 is a device which causes new instructions to be stored in separate queues on a first in first out basis. The queue control 600 actually utilizes the working memory 102 as the storage for the queue of instructions. Each program has its own queue. For example, for each different program in the data processor, there is a different queue for storing the corresponding data processing instructions. For each different memory location in the distributor memory (or angular position on disk) there is a different queue of disk file insrtuctions which are waiting to be executed. The detail of the queue control 600 and the way in which instructions are added and deleted from the queues is described in the above referenced co-pending patent application entitled "Multi-Program Data Processor." However, for purposes of explanation of the present invention, it is assumed that the program analyzer 500 does not send a disk file instruction to the distributor memory system 400 until after the current instruction in the corresponding memory location in distributor memory 404 has been executed. Therefore the operation of the queue is disregarded in the following description.

Consider an actual example of the instructions used in the system shown in FIG. 1. Assume that the first primary instruction of a program is stored at track 0 angular position 67. Also assume that the primary instruction word contained at track 0 angular position 67 is as shown in Table I:

TABLE I—EXAMPLE OF PRIMARY INSTRUCTION

Primary instruction

ADD; 37, 576; 49, 789; 29, 340; 32, 468

The primary instruction says to add the content of track 37 angular position 576 to the content of track 49 angular position 789 and store the result back into track 29 angular position 340. Then get the next primary instruction from track 32, angular position 468, for execution.

The program analyzer 500 will convert the primary instruction of Table I into four different disk file instructions as shown in Table II:

TABLE II

Disk file instructions:  Action
 (a) data; 37; *xxx; yyy* at AP 576 – Get A operand.
 (b) data; 49; *zzz; yyy* at AP 789 – Get B operand.
 (c) store; 29; *xxx;* — at AP 340 – Store result.
 (d) fetch; 32; —; — at AP 468 – Get next primary instruction.

The symbols *xxx, yyy* and *zzz* are representative of three different addresses in working memory 102. The — symbols in Table II represent the absence of information. Disk File Instruction (a) above says that data is to be obtained at track 37 angular position 576 and stored at address *xxx* in the working memory 102 and that the data processor instruction used to obtain the data is to be stored at working memory location *yyy*.

Disk File Instruction (b) says that data is to be obtained from track 49 angular position 789 of the disk storage unit 200 and stored at the working memory address *zzz*. The same as for the disk file instruction (a), address *yyy* identifies the storage location for the corresponding data processor instruction.

Thus, disk file instructions (a) and (b) are the instructions for obtaining the A and B operands from the disk storage unit 200 for storage in the working memory 102.

Disk File Instruction (c) of Table II says that a result obtained by the data processor 100 in processing the A and B operands is to be stored at track 29 angular position 340 and that such result can be obtained from working memory address *xxx*. The data processor 100 processes the two operands, under control of the data processor instruction of the Table III, by obtaining them from addresses *xxx* and *zzz* and stores the result back into the working memory location *xxx*.

The Disk File Instruction (d) of Table II says that a new primary instruction is to be obtained from track 32 angular position 468 for conversion by the program analyzer in a similar manner to the primary instruction shown in Table I.

The program analyzer 500 also converts the primary instruction of Table I into a data processor instruction which appears in Table III:

TABLE III

Data processor instruction

ADD; *xxx; zzz;* 29, 340; 32, 468

The data processor instruction of Table III says that the A operand which is obtained from the disk storage unit 200 and is stored at working memory address *xxx* and the B operand obtained from disk storage unit 200 and stored at working memory address *zzz* are to be added and the result stored back into working memory address *xxx*. The disk storage result address 29, 340, and the disk storage next instruction address 32, 468, are carried along with the instruction in the data processor 100 but are not used by the data processor during execution of the instruction. Thus, it will be evident that the data processor 100 may be a convenional type of 2-address computer which executes instructions having two addresses of two operands and the result of the operation is stored back into the address of the A operand.

Consider now the actual operation of the system shown in FIG. 1 and, in particular, the operation of the distributor memory system 400. Assume that the primary instruction shown in Table I is the first instruction to be executed and that it is stored at track 0 angular position 67.

The data processor 100 initially stores address 67 via data lines 106 into the random access address register 408. Also, at the same time, the data processor 100 stores the following disk file instruction into the information register 402:

fetch; 00; —; —

The data processor 100 applies a control signal to the control unit 412 via the control line 104. The control unit 412 then causes the gate 410 to couple the random access address register 408 to the distributor memory 404 and activates the distributor memory 404. The address 67 in register 408 causes the disk file instruction:

fetch; 00; —; — to be stored, immediately, into the distributor memory 404 at storage location 67.

The disk storage unit 200 is in operation and the disk is rotating, causing the angular position counter 306 to apply address signals to the gate 406. After the instruction is stored in the distributor memory 404, the control unit 412 causes the gate 406 to couple the angular position counter 306 to the distributor memory 404 and, with each new count of the angular position counter 306, the control unit 412 causes the distributor memory 404 to read out the content of the corresponding storage location.

Assume now that the disk is ready to have sector 306 read and that the angular position counter 306 addresses storage location 67 of the distributor memory 404. The disk file instruction fetch; 60; —; — is read out and stored in the information register 402. At this time section 402*a* contains the "fetch" operator and the section 402*b* contains the track number 00. The read/write control 304 is responsive to the fetch operator for causing the head selection circuit 302 to read out the content of track 00. Since the disk instruction operator is a fetch, the gate 314 couples the signals being read out through the head selection circuit 302 to the primary instruction lines 308 causing the primary instruction contained in track 00 angular position 67 to be stored in the program analyzer 500.

The distributor memory system 400 and the disk system 200 and 302 continue their operation and as each new count of the angular position counter 306 appears, the distributor memory 404 reads out the disk file instruction shown in Table I and contained in the corresponding storage location and stores it in the information register 402 for execution.

Subsequently, the program analyzer forms the disks file instruction 37; *xxx; yyy* shown in Table II. At this time the program analyzer 500 stores angular position number 576 into the random access address register 408 via the address lines 504 and the disk file instruction is stored into the information register 402. The control unit 412 then causes the instruction to be stored at address 576 of distributor memory 404 in a similar manner as that described above. After the instruction is stored, the gate 406 couples the angular position counter 306 back to the distributor memory 404 and the system continues its operation.

When address 576 appears in the angular position counter 306, the disk is properly positioned to begin an access to sector 576 and subsequently the disk file instruction; 37; xxx; yyy appears in the information register 402. Since the operator is a data operator, it specifies that data is to be obtained from track 37 and stored in the working memory 102 at address xxx. To this end, the read/write control 304 causes the head selection circuit to read out the content of track 37 and the gate 314 couples the data read from this location back to the information register 102a of the working memory 102 causing it to be stored there. Additionally, the gate 414, controlled by the data operator, stores the address xxx into the address register 102b of the working memory 102. The gate 416 is also responsive to the data operator to couple the address yyy back to another register (not shown) of the data processor 100. The address xxx contained in the address register 102b causes the operand contained in the information register 102a to be stored at address xxx for subsequent use by the corresponding data processor instruction.

Although it is not a part of the present invention, the data processor 100 uses the address yyy to determine whether or not the corresponding data processor instruction has been stored at yyy. If the data processor instruction has already been stored at yyy, then the digit number at the end of the data processor instruction (see FIG. 5) would be counted down one to reflect the fact that one of the operands for the particular instruction had been obtained from the disk storage unit 200.

The program analyzer 500 now forms the B operand disk file instruction data; 49; zzz; yyy shown at (b) of Table II. The B operand disk file instruction is stored in the distributor memory 404, similar to that described for the A operand disk file instruction, except that it is stored at storage location 789. Similar to that described above, the B operand contained at track 49 angular position 789 is subsequently read out and stored into the working memory 102a. However, the B operand is stored at memory location zzz, rather than xxx. Again, the data processor 100 receives the address yyy from the disk file instruction and the data processor determines whether the data processor instruction has been stored into the data processor 100. If it has, then the instruction is executed by the data processor.

Consider now how the data processor instruction shown in Table III is used once it has been formed by the program analyzer 500. After the data processor instruction is formed, it is stored into the information register 102a of the working memory by the program analyzer 500 via the instruction lines 510. At the same time, the program analyzer 500 stores the address yyy into the address register 102b via the address lines 508. The data processor 100 is then operative for storing the data processor instruction into the working memory at the address yyy.

The data processor then proceeds to execute the data processor instruction taking the A operand at address xxx and adding it to the B operand at the address zzz. The result of the arithmetic operation is then stored back into the working memory address xxx.

After the data processor instruction has been executed, the data processor instruction is sent back to the program analyzer 500 via the instruction lines 510. The program analyzer then forms the store disk file instruction. The store instruction is store; 29; xxx; — shown at (c) of Table II. This instruction is stored at storage location 340 of the distributor memory 404.

Assume now that the disk in the disk storage unit has rotated to the position wherein the angular position counter addresses location 340 and the disk file instruction shown at (c) of Table II is contained in the information register 402. A store operator is contained at 402a of the information register 402. The store operator says that information contained at working memory address xxx is to be read out and written in the disk storage unit in track 29 angular position 340. To this end, the gate 414 causes the address xxx contained at 402c of the information register 402 to be stored in the address register 102b of the working memory. The data processor 100 reads the content of location xxx and stores it into the information register 102a. The read/write control 304 is responsive to the store operator contained at 402a of the information register 402 to cause the result, now contained in the information register 102a, to be written in track 29 at angular position 340.

The program analyzer 500 then forms the fetch instruction fetch; 32; —; — shown at (d) of Table II. The fetch instruction is stored at storage location 468 of the distributor memory 404, similar to that described hereinabove, and is subsequently read out, stored in the information register 402, and used to obtain the next primary instruction from track 32 angular position 468 similar to that already described hereinabove.

Figure 2:
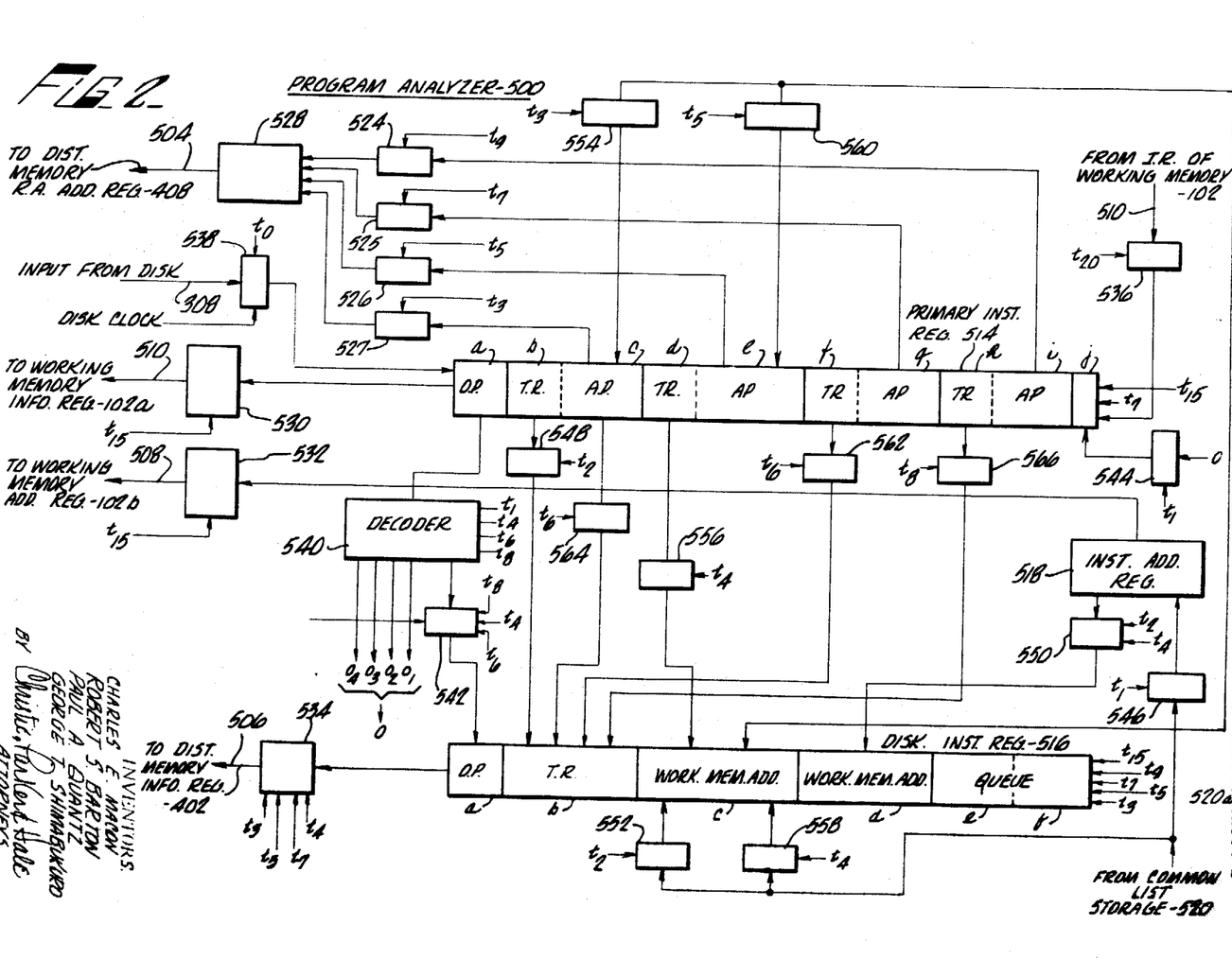
FIG. 2 is a schematic and block diagram of the program analyzer shown in FIG. 1.

Consider now the details of the program analyzer 500 shown in FIG. 2. The program analyzer 500 contains two major registers, namely, a primary instruction register 514 and a disk instruction register 516. The primary instruction register 514 is the one in which the primary instructions are initially stored and is used to assemble the data processor instructions and the disk instructions.

An instruction address register 518 is used for storing the address of a location in working memory 102 where a data processor instruction is to be stored.

Figure 3:
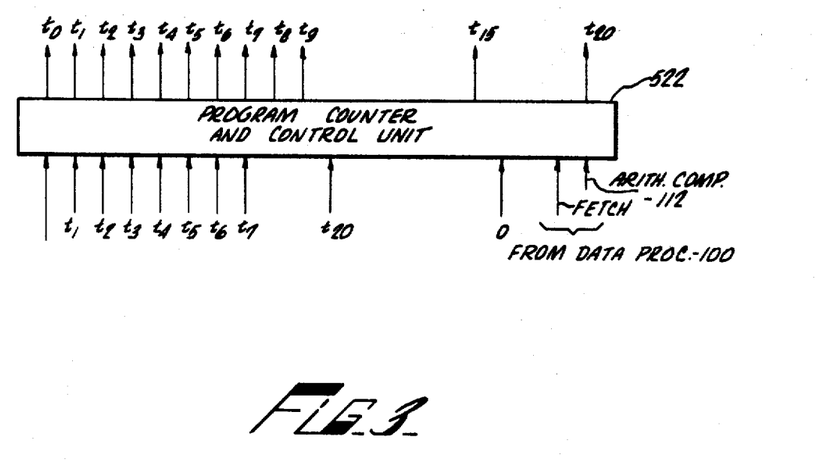
FIG. 3 is a block diagram showing the program counter and control unit for the program analyzer of FIG. 2.

FIG. 3 is a block diagram showing a program counter and control unit 522 for sequencing the operation of the program analyzer 500. With reference to FIG. 3, it will be noted that the program counter and control unit 522 has output circuits referenced by the symbols $t1$ through $t9$, $t15$, $t20$. Control signals are applied at these output circuits for controlling the operation of the program analyzer 500.

The primary instruction register 514 has six different parts. The portions of the primary instruction register 514 which store the angular position of the A and B operand addresses, the result address, and the next instruction address on disk are coupled through gates 524 through 527 to a gating circuit 528 which, in turn, is connected to the address lines 504. The address lines 504 are the ones which are connected to the random access address register 408. The primary instruction register 514 is connected through a gate 530 to the working memory information register 102a via the lines 510. The instruction address register 518 is connected to the working memory address register 102b by a gate 532 via the lines 508.

The disk instruction register 516 is connected to the distributor memory information register 402 via the instruction lines 506 by a gate 534. The primary instruction register 514 is connected to the output of the information register 102a of the working memory by a gate 536 via the address lines 510.

Consider the operation of the program analyzer while forming the instruction shown in Tables II and III from the primary instruction of Table I.

Figure 4:
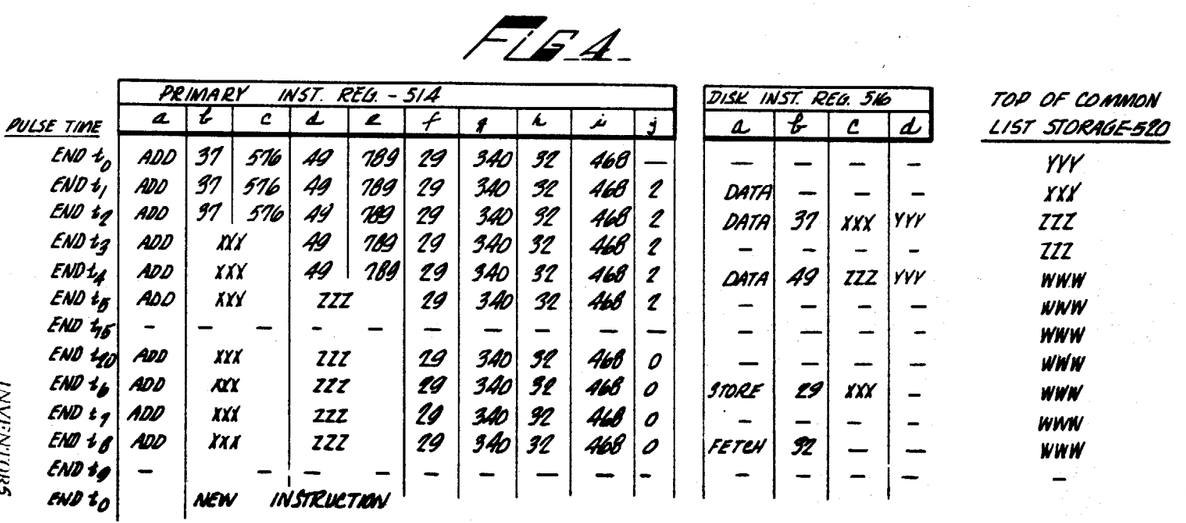
FIG. 4 is a sketch illustrating the sequential content of the information register, the distributor register and the top of the common list illustrating an example of the operation of the program analyzer of FIG. 1.

FIG. 4 should be referred to in the following description as it gives an example of the content of the primary information register 514, the disk instruction register 516 and the top of the common list storage unit 520 during the various states of operation of the program analyzer 500 for the example of Tables I, II and III. The various states of operation of the program analyzer 500 are depicted by control times which are represented by the various output circuits of the program counter and control unit 522 of FIG. 3.

Initially the primary instruction of Table I is stored into the primary instruction register 514. To this end, the gate 314 is serially applying the primary instruction to the line 308 and the program counter 522 forms an initial control signal at $t0$ causing the gate 538 to serially shift the primary instruction from the line 308 into the primary instruction register 514. It will be noted that gate 538 is also controlled by clock signals from the disk storage unit 200 which occur in synchronism with the information being read from the disk.

Referring to FIG. 4 it will be noted that at the end of the control signal at $t0$ the primary instruction has been stored in the primary instruction register 514, the disk register 516 is empty and the top of the common list storage unit 520 contains the address $yyy$.

The program counter and control unit 522 then forms a control signal at $t1$. During the control signal at $t1$ the disk file instruction operator is formed and is stored into position 516a of the disk instruction register. To this end a decoder 540 is coupled to the section 514a of the primary instruction register. Section 514a contains the primary instruction operator. The decoder 540 provides a number of different output signals dependent upon the operator contained in 514a. Specifically, the decoder 540 provides an output signal at one of its output circuits 01 through 04 depending on the number of operands that will be used in an instruction. If only one operand is to be used, then a control signal is formed at 01. If two operands will be needed a control signal is formed at 02, etc.

The decoder 540 also applies a control signal to a gate 542. The signal applied to the gate 542 is dependent on the operator stored in the primary instruction register and the state of the program counter and control units 522. In all cases the signal applied to gate 542 represents a disk file operator and the signal is to be placed in the disk file instruction in register 516. Therefore, the signals applied to gate 542 may represent any one of the following disk file operators, data, store and fetch.

Returning to the operation, the first disk file instruction formed is a data instruction. The decoder 540 is responsive to the add operator in 514a and the signal at $t0$ for applying a signal to the gate 542 representative of a data operator. Also, the control signal at $t1$ causes the gate 542 to store the data operator into the section 516a of the disk instruction register. Thus, at the end of $t1$, a data operator is contained at 516a of the disk instruction register and the rest of the disk instruction register 516 is empty.

The section 516j of the primary instruction register 514 stores the digit number. A decoding and gating circuit 544 is shown for causing a digit representative of the number of operands that need to be fetched, to be stored into the section 516j in response to the control signal at $t1$. Since two operands are to be formed, the decoder 540 forms a control signal at 01 and the gate 544 stores a digit 2 into 516j.

Also, a control signal at $t1$ causes a gate 546 to store the working memory address $yyy$, which is contained in the top of the stack in the common list storage 520, into the instruction address register 518. The common list storage 520 automatically removes the next address in the stack, address $xxx$ up to the top in the common list storage 520 in response to the control signal at $t1$.

The purpose of storing an instruction address in the instruction address register 518 is to hold this address during the formation of a number of different disk file instructions and also to make it available when storing the processor instruction into the working memory of the processor 100. In this manner the same address can be obtained at a later time from the instruction address register 518 as is needed.

At the end of the control signal at $t1$, the program counter 522 forms a control signal at $t2$. The control signal at $t2$ causes a gate 548 to store the track number at 514b into the section 516b of the disk instruction register. This same signal causes a gate 550 to store the working memory address $yyy$ (contained in the instruction address register 518) into 516d of the disk instruction register 516. Thus, the address $yyy$ is now contained in 516d as well as in the instruction address register 518.

Additionally, the control signal at $t2$ causes a gate 552 to store the top address $xxx$, contained in the common list storage 520, into section 516c of the disk instruction register 516. The signal at $t2$ causes the common list storage unit 520 to move the next address $zzz$ up in its stack. The queue of the disk instruction is left blank.

At this point the disk instruction is completely assembled in the disk instruction register 516. It is now ready to be sent over to the distributor memory system 400 to be used in obtaining the A operand. At the end of the control signal at $t2$ a control signal is formed at $t3$. The control signal at $t3$ causes the gate 534 to transfer the disk file instruction contained in register 516 into the distributor memory information register 402. The disk file instruction corresponds to track number 37 and angular position number 576 contained in 514b and 514c of the primary instruction register 514. Thus, the angular position number contained at 514c is the address of the location in the distributor memory 404 where the disk file instruction is to be stored. This number must be stored into the random access address register 408 for addressing the distributor memory 404. To this end, the control signal at $t3$ causes the gates 527 and 528 to store the angular position number 576 contained in 514c into the random access address register 408.

The bulk storage apparatus including the distributor memory system 400, the disk storage unit 200 and the disk electronic and control unit 300 continue their operation and read out the content of track 37 angular position 576 and the A operand data contained there is stored at working memory address $xxx$ as described hereinabove.

At the same time that the disk instruction is transferred over to the distributor memory system 400, the program analyzer starts forming the data processor instruction. To this end, the control signal at $t3$ causes the gate 554 to store the address $xxx$ contained in section 516b into sections 514b and 514c of the primary instruction register. The control signal at $t3$ also causes the content of the disk instruction register 516 to be cleared out and set to 0.

Thus, at the end of $t3$ the primary instruction in register 514 has been modified to contain the A operand address $xxx$, the disk instruction register 516 has been cleared and the top of the common list storage 520 contains the address $zzz$ as illustrated in FIG. 4.

Following the control signal at $t3$ the program counter and control unit 522 forms a control signal at $t4$. The control signal at $t4$ causes the gate 542 to store another data operator into 516a, causes a gate 556 to store the track number contained in 514d into section 516b of the disk instruction register, causes a gate 558 to store the top address $zzz$ in the common list storage 520 into the section 516c, causes the gate 550 to store the address $yyy$ contained in the instruction address register 518 into section 516d and causes the common list storage 520 to move the next address $www$ up to the top of the stack. At the end of $t4$ the primary instruction register 514 has the same information as it had at the end of $t3$. However, the disk instruction register 516 now contains the disk instruction for obtaining the B operand from the disk storage unit and the top of the common list storage 520 now contains the new address $www$.

Following the control signal at $t4$, the program counter and control unit 522 forms a control signal at $t5$. The control signal at $t5$ causes about the same operations as that described hereinabove for the control signal at $t3$. The disk instruction for the B operand contained in register 516 (see $t4$ of FIG. 4) is transferred into the information register 402 of the distributor memory and an angular position number is stored into the random access address register 408. The disk instruction for the B operand is associated with the track number and angular position number contained in 514d and 514e of the primary instruction register. Therefore, $t5$ activates gates 526 and 528 causing the angular position number 789 contained in 514e to be stored into the random access address register 408. As a result, the disk file instruction shown at *t*4 in FIG. 4 in the disk instruction register 516 is stored in storage location 789 of the memory 404.

The system continues to operate as described above causing the B operand to be obtained from track 49 angular position 789 and stored at address *zzz* of the working memory 102.

The control signal at *t*5 also causes a gate 560 to store the address *zzz*, contained in 516*c*, into the sections 514*d* and 514*e* of the primary instruction register and causes the content of the disk instruction register 516 to be cleared to zero.

Therefore, at the end of *t*5 the primary information register 514, the disk instruction register 516 and the top of the common list storage unit 520 are as shown in FIG. 4. The primary instruction register 514 now contains a completely assembled data processor instruction. With reference to FIG. 4, it will be noted that this includes the working memory addresses for the A and B operands, *xxx* and *yyy*. Therefore, the data processor instruction now contained in the primary instruction register is ready to be transferred to the working memory 102 for execution by the data processor 100.

Consider now the way in which the primary instruction is transferred from the primary instruction register 514 to the working memory 102. Following the control signal at *t*5, the program counter and control unit 522 forms a control signal at *t*15. The control signal at *t*15 causes the gate 530 to transfer the content of the primary instruction register 514 into the information register 102*a* of the working memory. Additionally, the control signal at *t*15 causes the gate 532 to transfer the primary instruction address *yyy* from the instruction address register 518 into the address register 102*b* of the working memory. The working memory 102 then proceeds to store the primary instruction into address *yyy* for execution by the data processor 100.

The detailed operation of the data processor 100 and the way in which it obtains and executes the data processor instruction is not essential to the understanding of the present invention and is not described herein. However, the data processor executes the instruction using the operands stored at *xxx* and *zzz* and stores the result at address *xxx* in a similar manner to that of a conventional 2-address computer which is well known in the computer art. The operands stored at address *xxx* and *zzz* are the ones stored in the working memory by the bulk storage apparatus using the disk file instruction previously formed by the program analyzer 500.

The control signal at *t*15 also causes the content of both the primary instruction register 514 and the disk instruction register 516 to be cleared and reset to 0.

After the data processor 100 completes execution of the data processor instruction it applies a control signal on the arithmetic operation complete line 112. The control signal causes the program counter and control unit 522 to form a control signal at *t*20. At the same time, the data processor 100 causes the working memory 102 to read out the data processor instruction contained at *yyy* and the instruction is stored in the information register 102*a*. Referring to FIG. 2 the control signal at *t*20 causes the gate 536 to store the data processor instruction back into the primary instruction register 514. Referring to FIG. 4, the end of *t*20, it will be noted that the data processor instruction is the same as it was at the end of *t*5 except that the digit 2 has been reduced to 0. This means that the data processor 100 did indeed receive both operands from the disk storage unit 200. The program analyzer now converts what is left of the primary instruction in the data processor instruction into two additional disk file instructions. The first disk file instruction which is formed causes the result of the arithmetic operation to be stored and the second one causes the next primary instruction to be fetched.

Following the control signal at *t*20 program counter and control unit 522 form a control signal at the output *t*6 followed by a control signal at *t*7. The control signals at *t*6 and *t*7 are used to form the disk file instruction which causes the arithmetic result contained in address *xxx* of the working memory 102 to be stored into the disk storage unit 200.

To this end, the control signal at *t*6 causes the gate 542 to place a store operator into 516*a* of the disk instruction register, causes a gate 562 to store the track number 29 contained in 514*f* into 516*b* of the disk instruction register and causes a gate 564 to store the address *xxx* contained in 514*b* and 514*c* into 516*c* of the disk instruction register. Nothing needs to be stored in sections 516*d*, 516*e* and 516*f* of the disk instruction register. Therefore, at the end of *t*6 a completely assembled disk file instruction is contained in the disk instruction register 516.

The subsequent control signal at *t*7 causes the gate 534 to store the disk file instruction into the information register 402 and causes the gates 525 and 528 to store the corresponding angular position number 340 from 514*g* into the random access address register 408.

The bulk storage apparatus, together with the data processor 100, proceed to address track 29 angular position 340 on the disk, obtain the arithmetic result stored at address *xxx* of the working memory 102 and store it at track 29 angular position 340. The control signal at *t*7 also causes the content of the registers 514 and 516 to be cleared.

Following the control signal at *t*7, a control signal is formed at *t*8 by the program counter and control unit 522. During the control signal at *t*8, the program analyzer 500 assembles the disk file instruction which is used to obtain the next primary instruction from the disk storage unit 200. This is done in essentially the same manner as described above for the other disk file instructions. The control signal at *t*8 causes the gate 542 to store a fetch operator into 516*a* of the disk instruction register 516 and causes a gate 566 to store track number 32 contained in 514*h* into 516*b* of the disk instruction register. Therefore, at the end of *t*8, a completely assembled fetch instruction is contained in the disk instruction register 516.

Following the control signal at *t*8, a control signal is formed at *t*9 by the program counter and control unit 522. The control signal at *t*9 causes the gate 534 to store the assembled disk instruction into the information register 402 and causes the gates 524 and 528 to store the angular position number 468 from 514*i* into the random access address register 408. The registers 514 and 516 are also cleared. The bulk storage apparatus then proceeds to fetch the next primary instruction from track 32 angular position 468 in the same manner as that described above for the first primary instruction. At the same time, the program counter 522 terminates the control signal at *t*9 and forms a signal at *t*0, and the next primary instruction, when it is obtained from the disk, is stored in the primary instruction register 514 as described above for the first primary instruction.

The data processing system continues its operation assembling new disk file instructions and new data processor instructions from each primary instruction, storing and obtaining information in the disk storage unit 200 under control of the disk file instructions and the data processor executes the data processor instructions similar to that described for the example above.

It should be noted that in the preceding discussion it would appear as if the disk file instructions are formed, stored in the distributor memory 400 and subsequently read out for execution before the next disk file instruction is stored in the distributor memory. The description is given in this manner for ease of description of the operation of the system. Actually, the program analyzer 500 forms many disk file instructions in a short period of time compared with the time for one revolution of the disk. As a result, most, if not all of the distributor memory locations are filled with disk file instructions at the same time. The distributor memory locations are read out, one at a time, as the corresponding sector becomes available for accessing. The speed with which the program analyzer forms the data processor instructions is sufficiently high that the data processor instructions are sent to the data processor before the first operand for a particular primary instruction is transferred from disk to the data processor.

It should also be noted that the operations of the program analyzer, the bulk storage system and the data processor are all asynchronous. Also the allocation of addresses is done automatically by the hardware.

Although one embodiment has been shown in order to illustrate the invention, it should be understood that many re-arrangements and modifications are possible within the scope of the present invention as defined in the following claims. For example, the invention is not restricted to a 2-address data processor. Additionally, other arrangements may be devised within the scope of the present invention for cross referencing the disk file instructions to the data processor instructions. Also, the disk storage unit is a preferred storage device and provides unusually good compatability with the program analyzer. However, other cyclically operable storage devices may be used such as drums, delay lines, closed loop tapes and achieve a preferred performance in accordance with the present invention.

The distributor memory system is a preferred means for providing disk file instructions for control of reading and writing in the disk files at the optimum time in relation to the angular position of the disk. However, the present invention is not restricted to such a device as will become evident from the following claims.

It should also be noted that the working memory has been disclosed as being a part of the data processor. However, it will be evident to those skilled in the art that the working memory may be physically a separate unit. The transfers of instructions and data have been shown as being directly to the registers associated with the memory. However, the transfer may also be to registers in the processor itself which may in turn send the information to the memory for storage within the scope of the invention. Therefore, the processor is defined as a device which may or may not include a memory but is normally associated with one in some manner.

What is claimed is:

1. A program analyzer comprising means for receiving a program instruction including an address for a storage device, a source of addresses, decoding means for decoding a portion of said program instruction for forming an operator giving an operation for such storage device for communication with a data processor, means for combining an address from said source with said operator and said storage address to form a first programming instruction for execution by such storage device, and means for combining the same said address from said source with at least a portion of said program instruction to form a separate second programming instruction for execution by such data processor.

2. A program analyzer for receiving and converting program instructions having an address identifying the angular position and track of a data location in a disk file system and an operator identifying an operation to be performed and for converting such a program instruction into both a disk file instruction and a data processor instruction, the combination comprising a first register for storing such program instruction and for use in forming a data processor instruction, a second register for storing a disk file instruction as it is formed, means coupled for transferring the track identification in said first register into said second register, means responsive to the program instruction in said first register for forming a control signal identifying whether a reading or writing operation is to take place at the disk file location corresponding to the track identification which is transferred, means for storing said control signal into said second register, a source of addresses of locations in a memory of a data processor, means for obtaining a first address from said source and for storing it into said second register to identify a memory location where a processor instruction is to be stored, means for obtaining a second address from said source and for storing it into said first and second registers to identify a memory location where an operand from such disk file is to be stored, and means for applying the first address and at least the operator and memory address of the instruction contained in said first register to a data processor for storage of the instruction in the memory location identified by the first address, and means for providing the disk file instruction contained in the second register and the angular position from said program instruction to a disk file system for control of reading and writing therein.

3. A program analyzer for receiving program instructions having an address identifying the angular position and track of a data location in a disk file system and an operator identifying an operation to be performed and for converting such program instruction into both a disk file instruction and a data processor instruction, the combination comprising a first register for storing such program instruction and for use in forming a data processor instruction, a second register for storing a disk file instruction as it is formed, means for storing the track identification contained in said first register into said second register, means responsive to the content of said first register for forming a control signal identifying whether a reading or writing operation is to take place at the disk file location corresponding to the track identification which is stored, gating means for storing said control signal into said second register, a source of addresses of locations in a memory of a data processor, gating means for storing an address from said source into said first and second registers to identify a memory location where an operand from such disk file is to be stored, and means for providing at least the operator and memory address of the instruction contained in said first register to a data processor for processing and means for providing the disk file instruction contained in the second register and the angular position contained in the first register to a disk file system for control of reading and writing therein.

4. A program analyzer as defined in claim 3 wherein the program instruction contains at least two addresses corresponding to two operands and control means is provided for causing the gating means to be activated a second time for causing two disk file instructions to be sequentially formed in said second register and provided to a disk file system for execution and for causing two addresses to be stored in the first register as the data processor instruction is formed.

5. A program analyzer as defined in claim 4 wherein the source of addresses provides a different address for storage in both said first and second registers for each of said two disk file instructions which are formed in said second register.

6. A program analyzer for receiving program instructions having an address identifying at least the angular position and track of a data location in a file system having a rotating storage member and an operator identifying an operation to be performed and for converting such program instruction into both a file instruction and a data processor instruction, the combination comprising a first register for storing such program instruction and for use in forming a data processor instruction, a second register for storing a file instuction as it is formed, means for storing the track identification contained in said first register into said second register, means responsive to the content of said first register for storing into said second register a control signal identifying whether a reading or writing operation is to take place at the file location corresponding to the track identification which is stored, a source of addresses of locations in a memory of a data processor, means for storing an address from said source into said first and second registers to identify a memory location where an operand from such rotating member is to be stored, and means for providing at least the operator and memory address of the instruction contained in said first register to a data processor for processing and means for providing the disk file instruction contained in the second register and the angular position contained in the first register to a disk file system for control of reading and writing therein.

7. A data processing system operative under control of program instructions for transferring data and for processing data the combination comprising a data processor controlled by a program of first programing instructions, storage means controlled by a second programing instruction for transferring information to and from said data processor, means for converting a said program instruction to separate first and second programing instructions and means for providing said first and second programing instructions to the corresponding data processor and storage means for execution thereby.

8. A data processing system as defined in claim 7 wherein said means for converting comprises means for receiving said program instruction from said storage means.

9. A data processing system as defined in claim 8 comprising addressable memory locations, and means for placing the address of one of said locations in both said first and second pragraming instructions.

10. A data processing system the combination comprising memory means,
a data processor operative for executing a program of data processor instructions stored in said memory means on data stored in said memory means,
storage means for storing data to be processed by said data processor and including means for executing a storage means instruction for transferring datum between said memory means and a storage location in said storage means which is identified by said storage means instruction,
means for receiving a program instruction identifying an operation for said data processor and referencing a corresponding storage location in said storage means containing datum to be used in such operation and including means for converting the received program instruction to a storage means instruction identifying said corresponding storage location and to a separate data processor instruction identifying said operation, and
means for transferring the resulting data processor instruction to the memory means as said program for execution by the data processor and the resulting storage means instruction to the storage means for execution by the storage means causing the datum in the identified storage location to be transferred to said memory means for processing in accordance with a data processor instruction.

11. A data processing system according to claim 10 wherein said storage means comprise storage locations which become available for accessing serially and cylically and additionally comprising a further storage apparatus including means for storing the storage means instructions in the order received and means for reading out the stored storage means instructions for execution in the order said storage locations become available for accessing.

12. A data processing system as defined in claim 10 wherein said storage means comprises serially and cylically available data positions therein, means coupled to said storage means for providing cyclical address signals identifying the data positions before they become available for accessing, further storage means having a storage location therein for each of said data positions, said means for converting program instructions including means for forming a data position address for each storage means instruction and means for coupling such position address to said further storage means along with a corresponding storage means instruction, said further storage means including means for storing such storage means instruction in the storage location indicated by the corresponding position adress, said further storage means comprising means for reading the storage means instruction from the storage location corresponding to a cyclical address signal and means responsive to the instructions read from the further storage means for transferring data between the corresponding cyclical data position and the memory means in accordance with such instruction.

13. A data processing system according to claim 10 wherein said program instructions are stored in said storage means and comprising means for coupling the program instruction to said means for receiving program instructions.

14. A data processing system according to claim 10 wherein said program instruction comprise binary coded bits including address bits for such identification of a storage location and operator bits for identifying such operation by said data processor, said means for converting being characterized in that the storage means instruction formed thereby contains said address bits and said data processor instruction formed thereby contains said operator bits.

15. A data processing system according to claim 14 wherein said means for converting comprises means for forming in said storage means instruction a binary coded signal indicative of whether a read or a write operation is to be performed by said storage means.

16. A data processing system according to claim 10 wherein said means for converting comprises means for inserting a memory means address into said data proccessor instruction which identifies where datum from said storage means is to be stored for execution by the data processor.

17. A data processing system according to claim 16 comprising a source of available memory means addresses for providing addresses to said means for inserting memory means addresses.

18. In a data processing system arcording to claim 10 including means for providing an address of a common memory means location in association with both said data processor instruction and said storage means instruction to the corresponding data processor and storage means and including means for applying said address associated with a storage means instruction to said memory means causing the corresponding datum from the storage means to be stored at such address.

19. A data processing system the combination comprising memory means, a data processor unit operative for executing a program of data processor instructions stored in said memory means on data stored in said memory means, storage means for storing data to be processed by said data processor and including means for executing a storage means instruction for transferring datum between said memory means and a storage location in said storage means which is identified by said storage means instruction, a processing unit for receiving a program instruction identifying an operation for said data processor unit and referencing a corresponding storage location in said storage means containing datum to be used in such operation and including means, independently operable from said data processor unit, for converting the received program instruction to a storage means instruction identifying said corresponding storage location and to a separate data processor instruction identifying said operation, and means for transferring the resulting data processor instruction to the memory means as said program for execution by the data processor unit and the resulting storage means instruction to the storage means for execution by the storage means causing datum in the identified storage location to be transferred to said memory means for processing in accordance with said program.

20. A data processing system the combination comprising addressable memory means, a data processor operative for executing a program of data processor instructions stored in said memory means on data stored in said memory means, the data processor instructions including operators and memory means addresses at which datum is located for processing, storage means for storing data to be processed by said data processor and including means for executing a storage means instruction for reading out datum from the storage location which is identified by said storage means instruction, means for receiving a program instruction containing an operator for said data processor and an address of a storage location in said storage means containing datum to be processed as directed by the associated operator, means for forming a storage means instruction containing the storage means address of a received program instruction and for forming a data processor instruction containing the operator from the same program instruction, a source of available memory means addresses, means for providing the resulting data processor instruction with an available address from said source to said memory means for execution by the data processor, means for providing the resulting storage means instruction together with the same available address to the storage means for execution by the storage means, and means for storing the datum read from the storage means into the address of the memory means identified by the memory means address associated with the storage means instruction used to obtain such datum.

21. A data processing system according to claim 20 comprising a further storage means for storing the storage means instructions as they are received from the corresponding means for providing and additionally for storing, in association therewith, the associated memory means address, and means for reading out the storage means instructions and associated memory means address from the further storage means to enable execution of the storage means instruction in reading out datum from the storage means and to enable the memory means address to be used in storing the datum in the memory means.

22. In a data processing system according to claim 21 wherein said storage means has serially and cyclically available storage locations, said further storage means comprising means for storing the storage means instructions and associated memory addresses in the order received and means for reading the storage means instructions and associated memory addresses back out of the further storage means in the order that the storage location identified by the address in each instruction becomes available for accessing.

References Cited

UNITED STATES PATENTS

| | | | |
|---|---|---|---|
| 3,158,844 | 11/1964 | Bowdle | 340—172.5 XR |
| 3,437,998 | 4/1969 | Bennett et al. | 340—172.5 |
| 3,217,298 | 11/1965 | Kilburn et al. | 340—172.5 |
| 3,234,519 | 2/1966 | Scholten | 340—172.5 |
| 3,387,277 | 6/1968 | Singer et al. | 340—172.5 |
| 3,389,380 | 6/1968 | Ashbaugh et al. | 340—172.5 |
| 3,400,380 | 9/1968 | Packard et al. | 340—172.5 |

PAUL J. HENON, Primary Examiner

H. E. SPRINGBORN, Assistant Examiner